United States Patent
Brandenstein et al.

[11] Patent Number: 5,984,562
[45] Date of Patent: Nov. 16, 1999

[54] ARRANGEMENT AND METHOD FOR FIXING TUBULAR ELEMENT IN A HOLE IN A PLATE ELEMENT

[75] Inventors: Manfred Brandenstein, Eussenheim; Wolfgang Friedrich, Schweinfurt; Roland Haas, Hofheim; Roland Harich, Höchheim; Gerhard Herrmann, Schweinfurt; Josef Stork, Gerolzhofen, all of Germany

[73] Assignee: SKF GmbH, Schweinfurt, Germany

[21] Appl. No.: 08/928,424

[22] Filed: Sep. 12, 1997

[30] Foreign Application Priority Data

Sep. 12, 1996 [DE] Germany .................. 196 37 015

[51] Int. Cl.$^6$ .................................................. B25G 3/28
[52] U.S. Cl. .................. 403/279; 403/282; 403/315; 411/44; 411/45
[58] Field of Search ................ 411/54, 54.1, 44, 411/45; 403/279, 282, 242, 248, 256, 277, 297, 315, 316; 138/89; 29/508, 520

[56] References Cited

U.S. PATENT DOCUMENTS 2,849,201  8/1958  Schelgunov .................. 411/44 X

FOREIGN PATENT DOCUMENTS

| 163108 | 5/1955 | Australia | 411/45 |
|---|---|---|---|
| 243028 | 10/1965 | Austria | 411/44 |
| 1524897 | 5/1968 | France | 411/54 |
| 3232926 | 3/1984 | Germany | 403/282 |
| 34 25 079 | 8/1992 | Germany . | |
| 568246 | 10/1957 | Italy | 411/45 |
| 200834 | 1/1966 | Sweden | 411/44 |
| 274954 | 7/1927 | United Kingdom . | |

*Primary Examiner*—Lynne H. Browne
*Assistant Examiner*—John R. Cottinghan
*Attorney, Agent, or Firm*—Burns, Doane, Swecker & Mathis, L.L.P.

[57] ABSTRACT

An arrangement for fixing a tubular element, such as a shaft, that is provided with a bore and a flange in position with respect to plate element involves the use of a ball that pressed into the bore in the tubular element. To achieve a simple fixation that is secure in both axial directions, the plate element is fixed on one side by the flange of the tubular element and on the other side by the bulge that is created through insertion of the ball into the bore in the tubular element. The ball has a greater diameter than that of the bore in the tubular element so that insertion of the ball into the bore causes the tubular element to become enlarged, thus forming the bulge.

14 Claims, 2 Drawing Sheets

ARRANGEMENT AND METHOD FOR FIXING TUBULAR ELEMENT IN A HOLE IN A PLATE ELEMENT

FIELD OF THE INVENTION

The present invention generally relates to a fixing arrangement and method for fixing together two elements. More particularly, the present invention relates to an arrangement for fixing a tubular element, such as a shaft, that is provided with a bore in a hole in a plate element.

BACKGROUND OF THE INVENTION

A known method for fixing bored machine parts on shafts or similar objects involves providing the shaft ends with blind bores into which spreading elements, such as for example balls, are pressed with a preload to expand the shaft end and thus create a connection between the parts which can no longer be reversed. GB 274,954 discloses this type of fixing arrangement.

In a similar connection of guide rods, two balls of various diameters are arranged so as to lie on top of one another. The bottom ball that rests on the bottom of a blind bore of one of the parts being fixed is adapted to the blind bore diameter while the top ball resting on the former is pressed into the other part's axial bore which possesses a smaller diameter than the ball in such a way that the steel ball expands this axial bore. A connection such as this is disclosed in DE 34 25 079.

In both of these arrangements, to achieve a press fit, the ball is pressed into the blind bore extending over part of the width of the machine part which is being fixed. However, this requires the application of great force in order to establish a secure press fit connection. The use of two or more balls per connection is also complex. Further, if the connection must also be designed to be secure in both axial directions, additional measures are required.

In light of the foregoing, a need exists for a fixing arrangement and method that results in a fixed connection that is secure in both axial directions. It would also be desirable to provide a fixing arrangement and method that utilize a relatively simple construction.

SUMMARY OF THE INVENTION

According to the present invention, a plate element and a tubular element such as a shaft are adapted to be fixed together. The plate element is fixed on one side by the flange of the tubular element and is fixed on the other side by a bulge on the tubular element, the bulge being created by a ball that is pressed through the end of the tubular element facing away from the flange, and with the ball having a greater diameter than the bore of the tubular element.

By virtue of this arrangement, the plate element is clamped in a form-fitting manner between the flange and the bulge, and the tubular element is thus perfectly fixed axially in both directions.

To create greater retention safety, a further aspect of the invention involves the section of the tubular element located behind the bulge and projecting beyond the plate element being at least partially retracted again after the ball has been pressed into the tubular element, i.e., reducing the diameter of the tubular element.

To construct the seating area between the tubular element and the plate element in a stable and accurate manner, the wall thickness of the tubular element can be constructed so that it is greater in the section that comes to rest in the hole of the plate element than the wall thickness in the other sections of the tubular element. Further, this section may even have a massive construction.

The present invention also provides an advantageous method for creating a fixing arrangement. The method, which employs a tubular element that is provided with a bore and a flange, and a ball whose diameter is greater than the diameter of the bore in the tubular element, involves pressing the ball into the tubular element from the end of the tubular element facing away from the flange, expanding the tubular element, and retracting the expanded tubular section with a pull or calibration tool until it rests at least partially again against the ball. The method can be preferably performed using a two-part tool consisting of a press punch and a calibration device guided on the punch.

BRIEF DESCRIPTION OF THE DRAWING FIGURES

Additional features and details associated with the present invention will become more apparent from the detailed description below considered with reference to the accompanying drawing figures in which like elements are designated by like reference numerals and wherein.

DETAILED DESCRIPTION OF THE INVENTION

Figure 1:
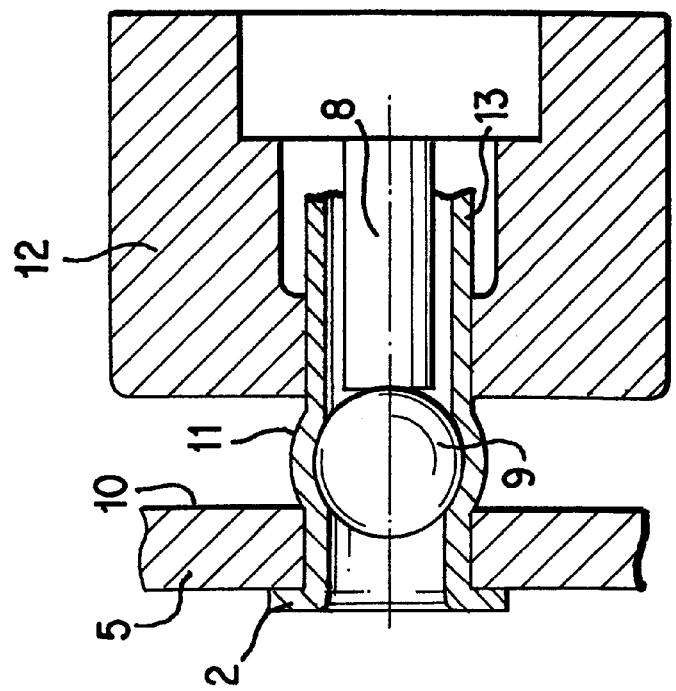
FIG. 1 is a cross-sectional view of the plate element and the shaft or tubular element prior to being fixed together through use of the fixing arrangement and method of the present invention.

With reference initially to FIG. 1, the present invention provides an arrangement for fixing a tubular element 3, such as a shaft, into a recess or hole 4 in a plate element 5, such as a wall element. The tubular element 3 is provided with a through bore 1 and a flange 2 that is located adjacent one end of the tubular element. The flange 2 is oriented radially outwardly generally perpendicular to the longitudinal axis of the tubular element 3.

Figure 2:
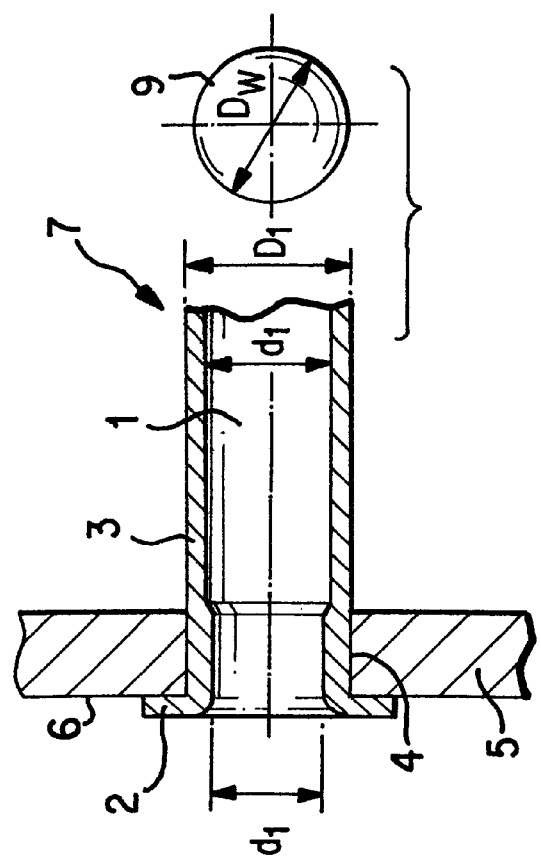
FIG. 2 is a cross-sectional view of the plate element and the shaft during pressing in of the ball into the shaft.
Figure 3:
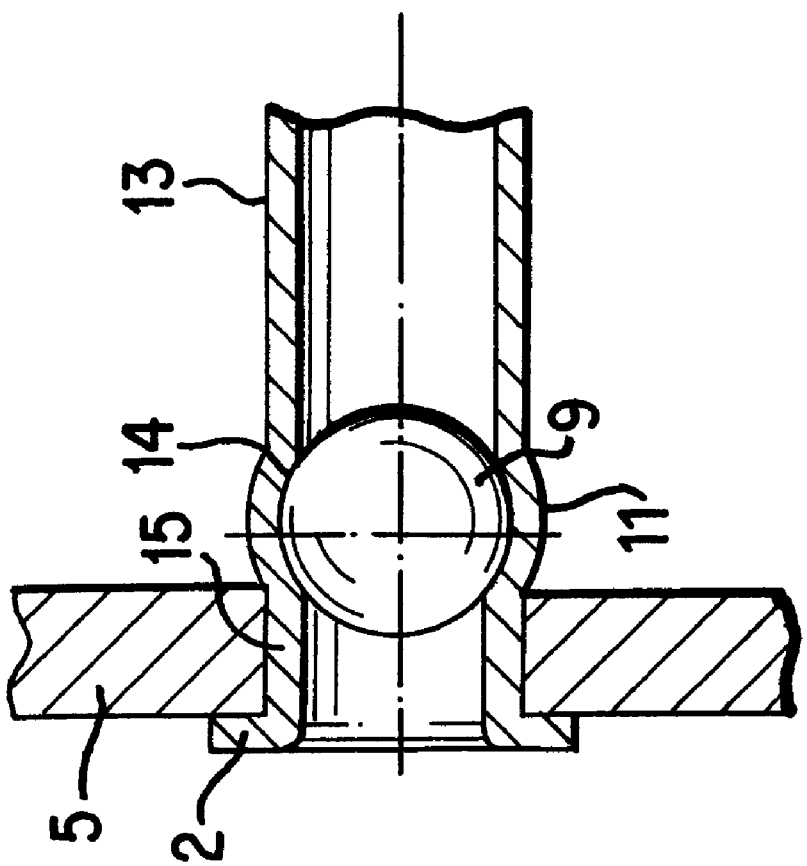
FIG. 3 is a cross-sectional view of the plate element and the shaft after pressing in of the ball into the shaft has been completed.

To fix the tubular element 3 and the plate element 5 with respect to one another, the tubular element 3 is pushed into the hole 4 in the plate element 5 until the flange 2 of the tubular element is positioned adjacent one side surface 6 of the plate element, preferably in contact with the one side surface 6 of the plate element 5. A ball 9 is then pushed into the bore 1 in the tubular element. The ball 9 possesses a diameter $D_w$ that is greater than the diameter $d_1$ of the bore 1 in the end section 7 of the tubular element that is remote from the flange 2. The ball 9 is pressed into the bore 1 in the tubular element from the end 7 of the tubular element 3 facing away from the flange 2 (i.e., from the right as seen with reference to FIG. 1). The pushing of the ball 9 into the bore in the tubular element 3 can be accomplished through use of a press punch 8 as seen in FIG. 2. As the ball 9 is pushed into the bore 1 in the tubular element 3 by the punch 8, the external diameter $D_1$ of the tubular element 3 expands in the manner shown in FIG. 2.

The ball 9 is pressed into the bore 1 to produce a bulge or bead 11 in the tubular element 3 at a place adjoining the side surface 10 of the plate element 5 opposite the side surface 6 at which is located the flange 2. This bulge 11 also helps press the flange 2 against the plate element 5 and thus fixes the tubular element 3 on the plate element 5. The plate element 5 is thus fixed on the one side 6 by the flange 2 and on the other side 10 by the bulge 11.

To prevent the ball 9 from shifting back to the right (i.e., away from the end of the tubular element 3 at which is located the flange 2) after the ball 9 has been pressed into its final position, an axially movable calibration matrix or device 12 guided on the punch 8 can be used to retract (i.e. reduce) the diameter of the sheath 3 again in the section 13 of the tubular element 3 up to the area of the ball 9 as shown in FIG. 2. That is, as the ball 9 is initially pressed into the bore 1 in the tubular element 3 from the end 7 of the tubular element, the outside diameter of the tubular element 3 from the end 7 up to the final resting position of the ball 9 tends to be enlarged. The use of the calibration device 12 allows the portion of the tubular element 3 of increased outer diameter from the end 7 up to the bulge 11 to be once again reduced. After using the calibration device 12, the portion of the tubular element located between the bulge 11 and the end of the tubular element 3 facing away from the flange 2 possesses an outside diameter less than the outside diameter of the bulge 11. The calibration device can be of such a design that it can be set or calibrated to effect the desired reduction in outer diameter of the tubular element 3.

After the punch 8 and the calibration device 12 are withdrawn, the ball 9 is axially fixed in position on the internal surface 14 of the arched bulge 11. The bulge 11 and the flange 2 thus fix the tubular element with respect to the plate 5.

As seen with reference to FIG. 1, the through bore 1 in the tubular element 3 is constructed such that a first portion of the bore located closest to the flange 2 possesses a diameter $d_1'$ while the remaining portion or second portion of the bore extending from the first portion towards the end 7 possesses a diameter $d_1$. The diameter $d_1'$ is smaller than the diameter $d_1$ and the two bore sections of different diameter are joined by a section of tapering diameter. This results in the portion of the tubular element 3 in the section 15 having a greater wall thickness, which provides a more stable seating surface. It is, however, also possible to construct the tubular element 3 in this section 15 massively, i.e., so that the bore 1 only extends from the end 7 up to this section. The outer diameter $D_1$ of the tubular member 3 prior to insertion of the ball 9 can be designed such that it is the same as or substantially the same as the internal diameter of the hole 4 in the plate element 5.

The principles, preferred embodiments and modes of operation of the present invention have been described above. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. Arrangement for fixing together two elements, comprising:

a tubular element possessing first and second ends and a central axis, the tubular element being provided with a bore and a flange positioned adjacent the first end;

a plate element provided with a hole, the plate element possessing oppositely positioned first and second side surfaces, the tubular element being positioned with respect to the plate element such that the tubular element extends through the hole in the plate element and the flange is positioned in contacting engagement with the first side surface of the plate element; and a ball located in the bore in the tubular element, the ball having a diameter greater than the diameter of at least a portion of the bore prior to insertion of the ball into the bore, the ball being pressed into the bore in the tubular element through the second end of the tubular element and creating a bulge in the tubular element adjacent the second side surface of the plate element so that the plate element is axially fixed on the first side surface by the flange and on the second side surface by the bulge, a portion of the tubular element extending substantially parallel to the central axis of the tubular element from the bulge to the second end of the tubular element, said portion of the tubular element which extends from the bulge to the second end having an outside diameter that is less than the outside diameter of the bulge.

2. Arrangement for fixing together two elements as claimed in claim 1, wherein the portion of the tubular element located between the bulge and the end of the tubular element facing away from the flange possesses an outside diameter less than the outside diameter of the bulge.

3. Arrangement for fixing together two elements as claimed in claim 2, wherein the tubular element includes a portion located within the hole in the plate element, the portion of the tubular element located within the hole in the plate element having a wall thickness greater than the wall thickness of the portion of the tubular element extending between the bulge and the end of the tubular element facing away from the flange.

4. Arrangement for fixing together two elements as claimed in claim 3, wherein the bore in the tubular element extends completely through the tubular element.

5. Arrangement for fixing together two elements as claimed in claim 2, wherein the bore in the tubular element extends completely through the tubular element.

6. Arrangement for fixing together two elements as claimed in claim 1, wherein the bore in the tubular element extends completely through the tubular element.

7. Arrangement for fixing together two elements as claimed in claim 1, wherein the tubular element includes a portion located within the hole in the plate element, the portion of the tubular element located within the hole in the plate element having a wall thickness greater than the wall thickness of the portion of the tubular element extending between the bulge and the end of the tubular element facing away from the flange.

8. Arrangement for fixing together two elements as claimed in claim 7, wherein the bore in the tubular element extends completely through the tubular element.

9. Arrangement for fixing together two elements, comprising:

a tubular element possessing first and second ends, the tubular element being provided with a bore and a flange positioned adjacent the first end;

a plate element provided with a hole, the plate element possessing oppositely positioned first and second side surfaces, the tubular element being positioned with respect to the plate element such that the tubular element extends through the hole in the plate element and the flange is positioned in contacting engagement with the first side surface of the plate element; and a solid spherical ball located in the bore in the tubular element, the ball having a diameter greater than the diameter of at least a portion of the bore prior to insertion of the ball into the bore, the ball being pressed into the bore in the tubular element through an end of the tubular element facing away from the flange and creating a bulge in the tubular element adjacent the second side surface of the plate element so that the plate element is axially fixed on the first side surface by the flange and on the second side surface by the bulge, the portion of the bore in the tubular element that is between the ball and the first end of the tubular element being open.

10. Arrangement for fixing together two elements as claimed in claim 9, wherein the portion of the tubular element located between the bulge and the end of the tubular element facing away from the flange possesses an outside diameter less than the outside diameter of the bulge.

11. Arrangement for fixing together two elements as claimed in claim 10, wherein the tubular element includes a portion located within the hole in the plate element, the portion of the tubular element located within the hole in the plate element having a wall thickness greater than the wall thickness of the portion of the tubular element extending between the bulge and the end of the tubular element facing away from the flange.

12. Arrangement for fixing together two elements, comprising:

a tubular element possessing first and second ends, the tubular element being provided with a bore and a flange positioned adjacent the first end;

a single plate element provided with a hole, the single plate element possessing oppositely positioned first and second side surfaces, the tubular element being positioned with respect to the single plate element such that the tubular element extends through the hole in the single plate element and the flange is positioned in contacting engagement with the first side surface of the single plate element; and a ball located in the bore in the tubular element, the ball having a diameter greater than the diameter of at least a portion of the bore prior to insertion of the ball into the bore, the ball being pressed into the bore in the tubular element through an end of the tubular element facing away from the flange and creating a bulge in the tubular element adjacent the second side surface of the single plate element so that the single plate element is axially fixed between the flange and the bulge, with only said single plate element being positioned between the flange and the bulge.

13. Arrangement for fixing together two elements as claimed in claim 12, wherein the portion of the tubular element located between the bulge and the end of the tubular element facing away from the flange possesses an outside diameter less than the outside diameter of the bulge.

14. Arrangement for fixing together two elements as claimed in claim 13, wherein the tubular element includes a portion located within the hole in the plate element, the portion of the tubular element located within the hole in the plate element having a wall thickness greater than the wall thickness of the portion of the tubular element extending between the bulge and the end of the tubular element facing away from the flange.

* * * * *